United States Patent [19]
Jones

[11] Patent Number: 6,019,244
[45] Date of Patent: Feb. 1, 2000

[54] FOLDABLE BOWL

[76] Inventor: Paul Jones, P.O. Box 16, Gunnison, Colo. 81230

[21] Appl. No.: 09/085,734

[22] Filed: May 27, 1998

Related U.S. Application Data

[60] Provisional application No. 60/047,538, May 27, 1997.

[51] Int. Cl.$^7$ .............. B65D 6/16; B65D 6/36; B65D 5/01
[52] U.S. Cl. .............. 220/666; 119/61; 220/6; 220/574; 383/74; 383/75; 383/104
[58] Field of Search .............. 383/74, 75, 104, 383/119, 39, 113; 220/6, 7, 574, 574.3, 651, 637, 654, 666; 119/61, 72, 51.5, 65

[56] References Cited

U.S. PATENT DOCUMENTS

| | | | |
|---|---|---|---|
| 216,227 | 6/1879 | Sedgwick | 220/666 X |
| 1,225,511 | 5/1917 | Sexton | 383/119 X |
| 1,691,904 | 11/1928 | Gamble | 383/75 X |
| 2,502,586 | 4/1950 | Ottinger | 383/119 X |
| 2,575,893 | 11/1951 | Seaman | 383/25 |
| 4,337,812 | 7/1982 | Trinker | 383/109 X |
| 4,383,564 | 5/1983 | Hoie | 220/666 X |
| 4,715,499 | 12/1987 | Franklin | 383/39 X |
| 4,738,547 | 4/1988 | Brown | 383/39 |
| 4,762,087 | 8/1988 | Henecke | 119/61 |
| 5,238,307 | 8/1993 | Mooney et al. | 383/74 |
| 5,810,194 | 9/1998 | Samsel | 220/574 |

FOREIGN PATENT DOCUMENTS 162246 7/1991 Japan ..................... 383/113

OTHER PUBLICATIONS

Plow & Hearth Summer 1998 sales catalog, p. 25, Items 4898 and 4908.
Wolf Packs® Internet advertisement of May 19, 1998.
Doggone Good! Internet advertisement of May 19, 1998.
Handsome Rewards® advertisement received Mar. 1998, Items #11–55488–8 and #11–55487–0, Perris, CA.
Cabela's Fall 1997 catalog, p. 361, item HH–61–2951.
XL SportCenter advertisement, Fairfield, CT.

Primary Examiner—Allan N. Shoap
Assistant Examiner—Joe Merek
Attorney, Agent, or Firm—Greenlee, Winner and Sullivan, P.C.

[57] ABSTRACT

A portable, foldable, leak-proof bowl is provided, suitable for use by hikers and campers to provide drinking water to dogs and other pets. The bowl comprises a flexible hoop capable of being twisted into at least two circles of smaller diameter, a foldable material attached to the hoop so as to define a circular bottom for the bowl, and a side also made of a foldable material, said side being preferably in the form of a cone section tapering toward the top. The bowl folds into a compact, aesthetically pleasing circular packet, and when fasteners holding it in the folded position are released, automatically opens to its ready-to-use bowl-shaped configuration.

20 Claims, 5 Drawing Sheets

FOLDABLE BOWL

CROSS-REFERENCE TO RELATED APPLICATIONS

This application claims priority to U.S. application Ser. No. 60/047,538 filed May 27, 1997, which is hereby incorporated by reference to the extent not inconsistent herewith.

BACKGROUND

Hikers and campers in dry country typically carry drinking water for themselves in canteens but, when their dogs are with them, have difficulty providing water in containers their dogs can drink from.

Various portable and foldable containers have been described. A container with a sealed lid is described in U.S. Pat. No. 5,209,184. A foldable dog food container formed from a precut-perforated cardboard blank to form a dog food dispenser is described in U.S. Pat. No. 4,231,326. A liner for a fowl feeding tray made by folding a liner material to form a dish shape is described in U.S. Pat. No. 5,709,167. A box designed to support a food or beverage suspended by a strap around the neck of a wearer is described in U.S. Pat. No. 4,915,278. U.S. Pat. No. 5,458,270 describes a foldable liquid container for preventing leakage. A collapsible container for bulk goods or liquid is described in U.S. Pat. No. 5,622,277. A portable folding water tank is described in U.S. Pat. No. 4,383,564.

L.L. Bean's 1996 Fall or Christmas catalog advertises a foldable pet bowl having a square bottom and constructed from fabric material. A plastic pet travel canteen with a lid has also been advertised in R.C. Steele's Fall 1996 Pet Supplies catalog.

None of the pet bowls and collapsible containers known to the art are designed to fold into an elegant, compact circular packet which can be carried in a pocket. Furthermore, none of these designs provide a bowl capable of opening spontaneously upon the release of fasteners keeping it in the folded position. It is an object of this invention to provide a simple, circular bowl design which is portable and foldable into an elegant, small, circular packet, which can be fastened into a folded position with a single fastener and which opens automatically into a ready-to-use bowl when the fastener is released.

SUMMARY OF THE INVENTION

A foldable bowl is provided comprising:
a) a side, having a top and a bottom edge, which is capable of being folded and of returning to its original shape after folding;
b) a bottom, attached to said side or formed as an integral part thereof, which is capable of being folded and of returning to its original shape after folding;
c) a flexible hoop attached to an outer edge of the bottom which is capable of being bent and of returning to its original shape after bending.

The bowl folds or collapses so that the interior space provided by the bowl in its open form is eliminated, and the material of the bowl is compacted into a small, circular packet that fits easily into a pocket. The bowl is especially useful as a portable container for drinking water for hikers to use to provide their dogs with water in dry country.

The bowl is preferably tapered smaller toward the top, or it may be cylindrical in shape, although it can be any shape having a side and bottom and capable of holding a substance such as food or water.

The side of the bowl is preferably formed of a single strip of material with the edges sewn together. The bottom is preferably a circular piece of material. The materials from which the side and bottom are made should be materials such as fabric or sheets of plastic or other substances which are capable of being folded and returning to their original shape after folding. The side and bottom may be formed of separate pieces of material, or may be made of a single piece of material gathered at the top so as to form a sack-like shape. The top edge of the side is preferably circular, and the bottom is preferably circular as well.

The flexible hoop around the edge of the bottom must be made of a material such as plastic or spring steel which can be bent (or folded) and which is capable of returning to its original shape thereafter. Preferably the flexible hoop returns to its original shape spontaneously when not being held in the bent or folded position. When twisted, the hoop is capable of forming at least two smaller circles. Larger embodiments of the bowl used as basins may fold by twisting the hoop into at least three smaller circles.

The bowl also preferably comprises a drawstring channel, attached to or formed as an integral part of, the top edge of the side, in which channel a drawstring is disposed. Such channels may be formed by turning down (inwardly or outwardly) the top edge of material of the side or of a lining for the bowl, or by attaching a piece of fabric tape or strip of fabric or tape over the top edge to form a channel. A cordlock, i.e. a commercially available plastic piece of a size designed to accommodate the drawstring, may be placed on the drawstring to hold it in any desired tightened position and prevent the drawstring from working free from the channel.

The bowl also preferably comprises a water-resistant lining disposed within the space formed by the bottom and side. The term "water-resistant" includes "waterproof." Preferably this lining is formed of a single, circular piece of material which is capable of being folded and of returning to its original shape after folding. The bowl is preferably substantially leakproof, i.e. will hold liquid for at least ten or fifteen minutes to allow the bowl to be used to provide an animal with drinking water. More preferably, the bowl is essentially leakproof, which is defined herein to mean capable of holding liquid at least overnight or longer.

Fastening means are provided on the bowl, preferably attached to the bottom thereof, to hold the bowl in its folded position. In a preferred embodiment, "hook and loop" fasteners are used, with a strip of either the hook or the loop version attached to the bottom near the edge thereof, and a mating fastener attached to a strip fabric or webbing placed 90 degrees around the circumference of the bottom from the first fastener. Other fasteners known to the art may be used as well. In an alternate embodiment, another fastener like the first is attached to the bottom edge of the bowl opposite the first fastener. The webbing to which the mating fastener is attached should be long enough to wrap around a portion of the device when it is in its folded position to secure it in the folded position when the mating fastener on the webbing is fastened to the first fastener on the bottom of the bowl.

This invention also provides a method of folding a foldable bowl as described above comprising:
a) Collapsing the side by pulling the drawstring tight, whereby the bowl is in a flat configuration. Preferably, the drawstring and cordlock are then placed inside the bowl.
b) Folding opposite sides of said flat configuration together. The user grasps opposite points on the circumference of the flexible hoop within its channel and pulls them upward toward each other. One of the points grasped by the user is preferably the point at which a fastener is attached to the bottom near the edge thereof.

c) Overlapping one of the opposite sides over the other whereby said flexible hoop is twisted causing points on the sides thereof orthogonal to the overlapping portions to move downward toward each other. Preferably the point having the fastener attached is lapped over the opposite side.

d) Overlapping one of said orthogonal points over the other whereby said flexible hoop forms two smaller substantially equal circles. Preferably the orthogonal point overlapping the other orthogonal point is equipped with a mating fastener on a strip of webbing attached to the edge of the bottom.

e) Pressing said smaller circles together and securing them in place. Typically, the circles will need to be adjusted so that they can be flattened optimally together. The fastener attached to the bottom is then mated with the mating fastener attached to an orthogonal point on the bottom, preferably by overlapping the webbing to which the mating fastener is attached over the edge of the circles and bringing it into position so that the fasteners can mate.

To use the bowl for presenting a substance for use, i.e., water for drinking or storage, food for eating, or other substances such as beads to be strung, peas to be shelled, or bodily waste products to be disposed of, and the like, it is opened or unfolded from its folded position to form a bowl, and the substance is placed in the bowl.

In a preferred embodiment, the bowl comprises:

a) a side having a top edge and a bottom edge, the diameter of the bottom edge being larger than the diameter of the top edge, made of a single strip of material, which is capable of being folded and of returning to its original shape after folding, by sewing the ends of said strip together;

b) a bottom made of a circular piece of material, which is capable of being folded and of returning to its original shape after folding having an outer edge attached to the bottom edge of said side;

c) a flexible hoop disposed within a hoop channel attached to or formed as an integral part of an outer edge of the bottom, said hoop being capable of being bent and of returning to its original shape after bending;

d) a water-resistant lining disposed within a space formed by said side and bottom;

e) a drawstring channel attached to or formed as an integral part of the top edge of the side;

f) a drawstring disposed within said drawstring channel;

g) a cordlock threaded onto said drawstring;

h) a first fastener attached to a surface of said bottom at a point near the edge thereof; and i) a second, mating fastener attached by means of a strip of material, such as a strip of webbing, to a point on said bottom orthogonal to said first fastener.

A method of making such a foldable bowl is also provided comprising:

a) forming a side for said bowl of a material which is capable of being folded and of returning to its original shape after folding;

b) attaching to said side a bottom made of a material which is capable of being folded and of returning to its original shape after folding; and c) attaching a flexible hoop, which is capable of being bent and of returning to its original shape after bending, to an outer edge of the bottom.

As discussed above, fasteners may also be attached to the material of the bottom for securing the bowl in its folded configuration.

The side of the bowl is preferably formed of a strip of material having one edge thereof shorter than the other, with the two ends cut at the same angle, by matching the edges of the two ends and fastening them together, preferably by sewing, to make a truncated cone which tapers to a smaller diameter from bottom to top.

A lining may be formed by inserting a circular piece of water-resistant material, which is capable of being folded and of returning to its original shape after folding, into the space formed by the side and bottom. Thereafter, the outer (top) edge of the lining may be secured to the top edge of the side. A channel for a drawstring may also be formed at the top edge of the side, with a drawstring equipped with a cordlock disposed in the channel.

The bowl is ideal for outdoor recreationists who need a compactible waterproof container to carry or hold water, food or other substances. The flexible hoop allows the bowl to be folded the same way every time into a small package that fits easily into a pocket. It is durable and retains its shape. It can be used for a variety of purposes including, but not limited to, use as a pet watering/feeding dish or a wash basin, and larger versions can be used to water or feed large animals such as horses. It may also be used to build small temporary pools or reservoirs for military, emergency, scientific, pleasure, or other purposes. Hunters, hikers, and dog owners who regularly exercise their pets in warm, arid climates can provide a way to water their dogs and prevent the harmful effects of dehydration. In preferred embodiments, the bowl is leak-proof and capable of holding water overnight or longer.

DETAILED DESCRIPTION

Figure 1:
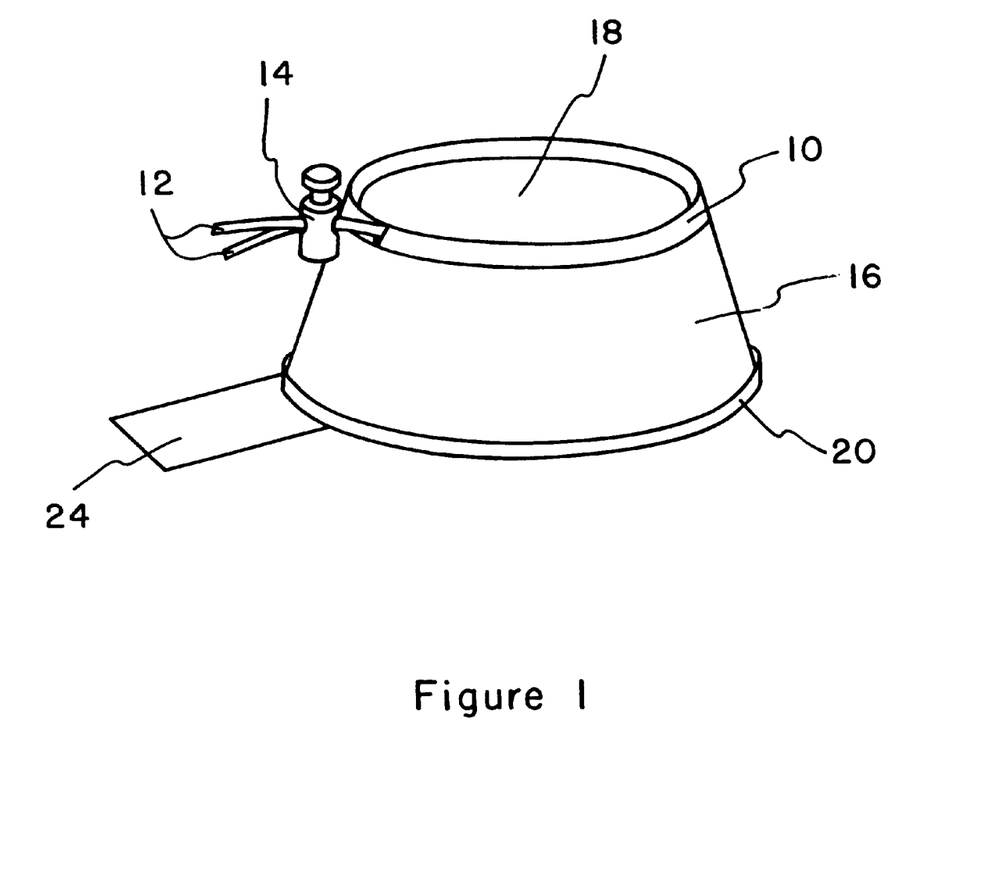
FIG. 1 is a perspective view of the bowl.

As shown in FIG. 1, the foldable bowl of this invention in its open position ready for use comprises side 16 made of a foldable material, hoop channel 20 at the junction between side 16 and the bottom which is also made of a foldable material, a drawstring channel 10, formed at the top of side 16, into which drawstring 12 has been threaded. Cordlock 14 locks the two ends of drawstring 12 in place. Webbing 24 is attached to the bottom of the bowl. Lining 18 is a circle of foldable waterproof material sized to conform to the inside dimensions of the bowl.

Figure 2:
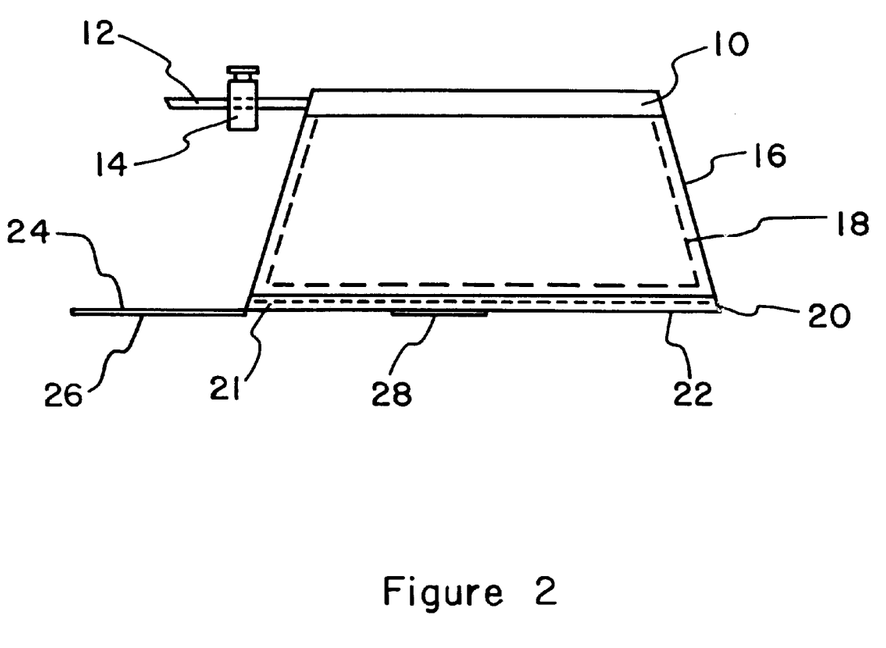
FIG. 2 is a side view of the bowl with dotted lines showing internal features.

FIG. 2 is a side view of the foldable bowl showing side 16, bottom 22, and drawstring 12 disposed within drawstring channel 10, locked with cordlock 14. The dotted lines along the side and the upper dotted line along the bottom show lining 18 in the interior of the bowl. At the junction between bottom 22 and side 16 is hoop channel 20, inside of which, shown by the dotted line along the bottom, is flexible hoop 21. A first fastener 28, which is preferably a strip or square of "hook and loop" fastener, and preferably comprises loops, is attached to bottom 22. Mating fastener 26 is attached to the bottom of webbing 24. Webbing 24 may be attached to bottom 22, hoop channel 20, or the bottom edge of side 16 at a point approximately 80 to 90 degrees around the circumference of bottom 22 from fastener 28. Mating fastener 26 is preferably of the "hook and loop" type, and more preferably comprises hooks.

Figure 3:
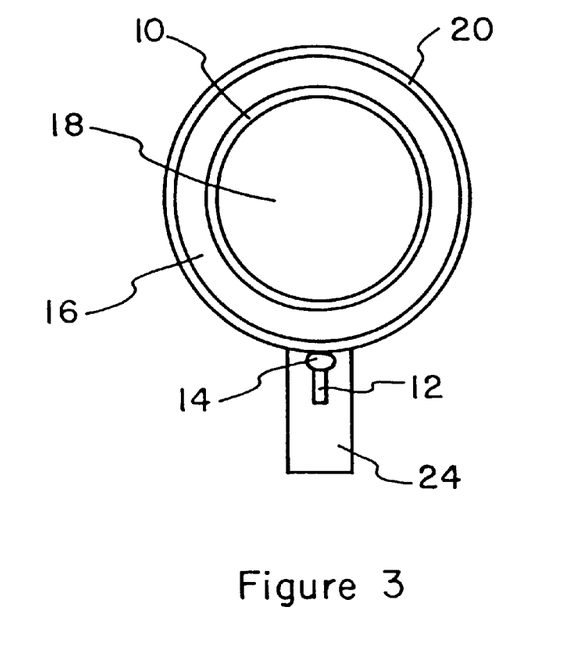
FIG. 3 is a top view of the bowl.

FIG. 3 is a top view of the foldable bowl showing drawstring channel 10, and drawstring 12 emerging therefrom and held by cordlock 14. Side 16 is seen in this view which is a preferred embodiment in which the circumference of drawstring channel 10 is less than that of hoop channel 20. Lining 18 is visible inside the bowl, and webbing 24 is seen emerging from the bottom edge of the bowl.

Figure 4:
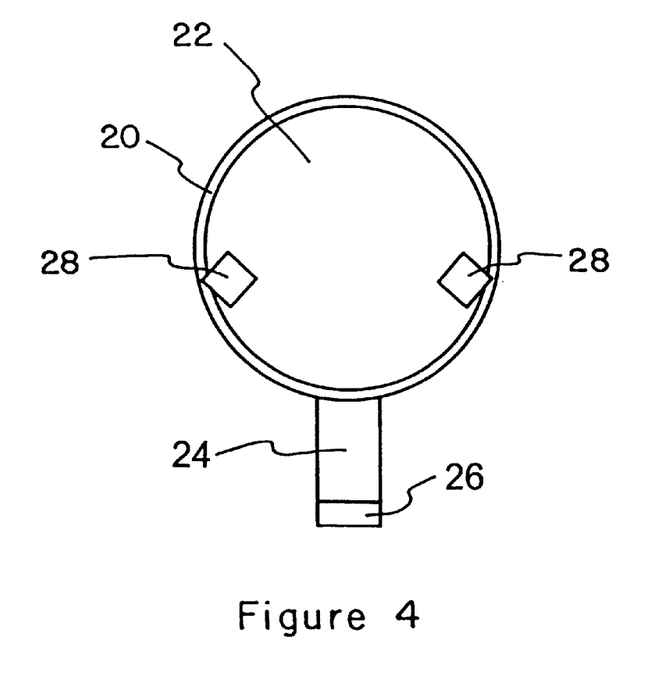
FIG. 4 is a bottom view of the bowl.

FIG. 4 is a bottom view of an embodiment of the foldable bowl showing two identical fasteners 28 attached to bottom 22. In a preferred embodiment, only one fastener 28 is used. Hoop channel 20 defines the circumference of bottom 22. Webbing 24 at the bottom edge of the bowl is placed at an angle of about 90 degrees from fasteners 28. Mating fastener 26 is attached to the bottom of webbing 24.

Figure 5:
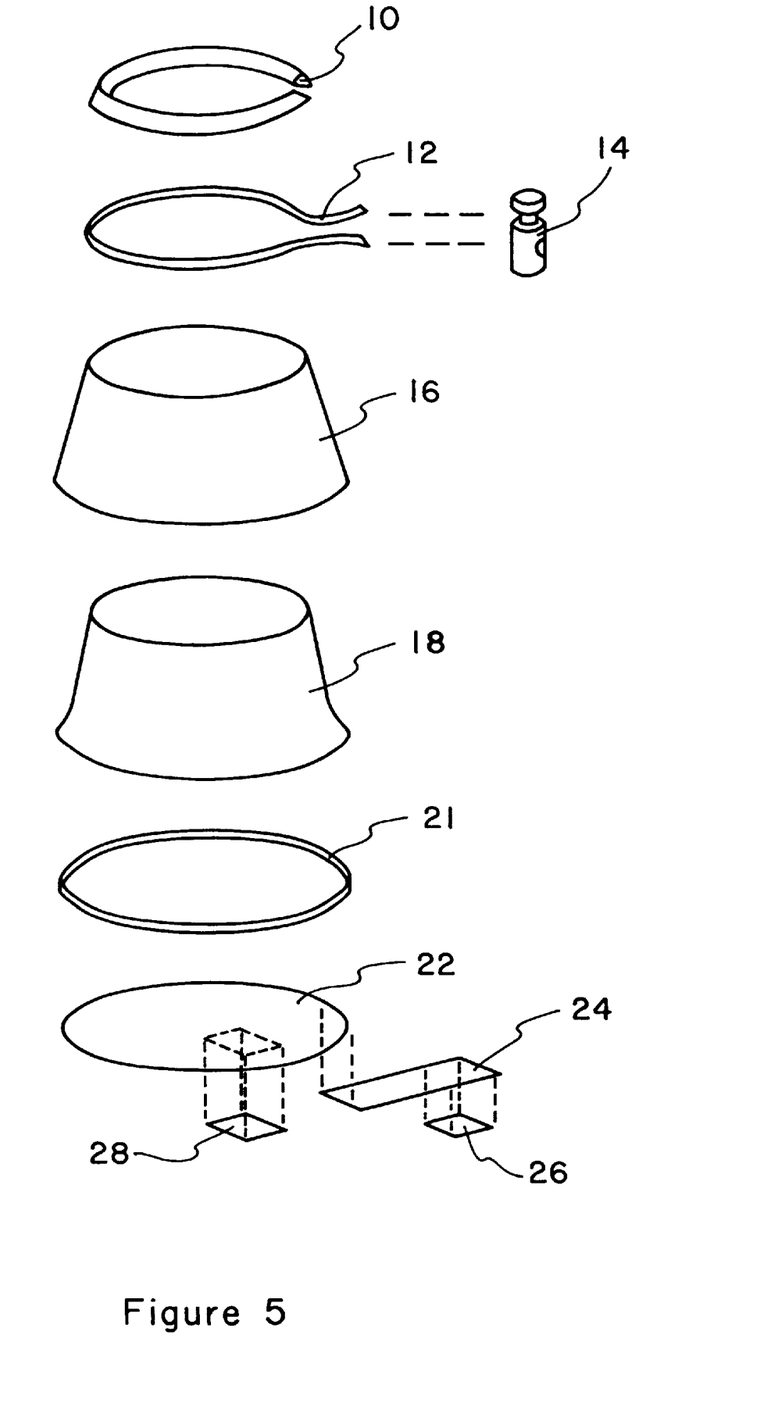
FIG. 5 is an exploded side view of the bowl.

FIG. 5 is an exploded view of components of a preferred embodiment of the foldable bowl. Drawstring channel 10 is preferably made of a separate strip of foldable material attached to side 16 and lining 18. Alternatively, the top edge of side 16 and/or the top edge of lining 18 may be turned in or out to form drawstring channel 10. Side 16 is sized at the lower end to fit flexible hoop 21. Bottom 22 is also sized to fit flexible hoop 21. Fasteners 28 are attached beneath bottom 22. In the preferred embodiment, only one fastener 28 is attached to bottom 22. Webbing 24 may also be attached to bottom 22, and mating fastener 26 is attached to the bottom of webbing 24. Alternatively, the end of webbing 24 may be inserted above bottom 22 or above flexible hoop 21.

To make the device, the components shown in FIG. 5 are assembled. The components can be made of any material which is durable and capable of being repeatedly folded. Preferably the material used to form the outer surfaces of the bowl is a durable fabric of the type used for making outdoor backpacks, and the material used to form the inner surface of the bowl is made of a single piece of water-resistant, e.g. waterproof, fabric.

The ends of a strip of foldable material are sewn together in a vertical seam, to form side 16, which is preferably sloped or tapered inwardly and upwardly for economy of material and to provide an aesthetically pleasing profile to the bowl, although such tapering is not essential in the preferred embodiment. Tapering may also keep the bowl open when liquids such as water are put into the bowl. Pressure from the water is contained by the sloping sides, causing the bowl to tighten and inflate.

Fasteners 28 are sewn or otherwise attached to the edge of bottom 22, preferably positioned substantially opposite each other as shown in FIG. 5. In a preferred embodiment, only one fastener 28 is used.

Circular bottom 22 is sewn or otherwise attached to the bottom edge of side 16, preferably with the end of webbing 24 inserted there between so that webbing 24 will be securely attached to the bottom edge of the bowl. The bowl-shaped construction so formed is turned inside out to place the seams inside and the major portion of webbing 24 outside. Mating fastener 26 is sewn or otherwise attached to the bottom of webbing 24.

Flexible hoop 21 is preferably formed from a hat grommet, such as may be obtained commercially from the Midway Cap Company of Chicago, Ill., or a welded springband obtained from Vulcan Spring Mfg. Co., Telford, Pa. Alternatively, strips of other flexible materials which are capable of bending and returning to their originals shape, such as spring steel strips, may be used. The flexible material or hat grommet is formed into a loop and inserted into the bowl adjacent to the seam between the bottom 22 and side 16. A line of stitching is then run from the outside of the bowl, around the inner circumference of flexible hoop 21 to attach side 16 to bottom 22, thereby forming hoop channel 20. Other ways of forming hoop channel 20 may also be employed, such as providing a separate fabric strip to form the channel, or by turning the bottom of side 16 under and securing it, e.g. by sewing, so as to form a channel. As will be understood by those skilled in the art, hoop channel 20 is not absolutely necessary.

Lining 18, is formed of a circular piece of waterproof or water-resistant material. Any such material may be used which is capable of being folded, including nylon, coated nylon, fabric with porous membranes such as Gortex®, cotton and natural fabrics, preferably coated, plastic and rubber. Lining 18 is sized to fit the inside of the bowl, and upon insertion into the bowl forms an inner sack with its outer edge adjacent to the top of side 16. The circumference of lining 18 is gathered to fit the top circumference of side 16. The gathered outer edge of lining 18 is then sewn, tacked, or otherwise attached to the top edge of side 16.

A strip of material used for forming drawstring channel 10 is then folded over the top circumference of the bowl and sewn or otherwise secured in place. The drawstring 12 may be placed adjacent to the inner surface of the fabric strip before it is attached to the top edge of the bowl, or drawstring 12 may be threaded into drawstring channel 10 after it has been formed.

Cordlock 14, is then preferably attached to both ends of drawstring 12. The cordlock 14 is used to keep the drawstring from working its way out of the channel and becoming lost, however, as will be appreciated by those skilled in the art, is not an essential component of the bowl.

As will be appreciated by those skilled in the art, attachment of the various parts may be accomplished by means other than sewing, e.g. through the use of fabric adhesives. As will be further appreciated by those skilled in the art, the steps may be performed in any logical order, not necessarily in the order given. Seams may be finished, and treated with seam sealant if desired.

FIGS. 6A through 6E show how the bowl may be folded by twisting the flexible hoop forming the perimeter of the bottom to make two substantially equal smaller circles which may be pressed together, compressing the bulk of the attached foldable material forming the side 16, bottom 22 and channel 20 of the bowl into a substantially flat, circular configuration which is secured in this folded position by mating fastener 28 with mating fastener 26.

Figure 6A:
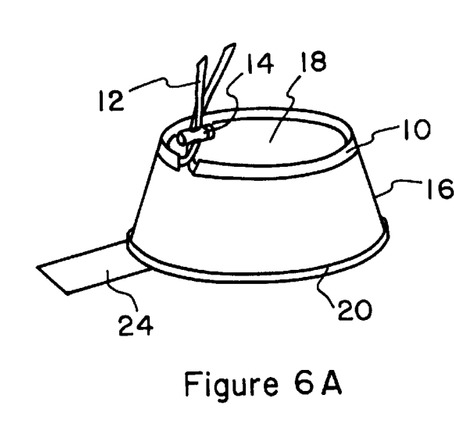
FIGS. 6A through 6E show successive steps for folding the bowl by twisting the flexible hoop forming the perimeter of the bottom to make two substantially equal smaller loops which are pressed together and fastened into place.

FIG. 6A is a side view of the bowl in its open configuration.

Figure 6B:
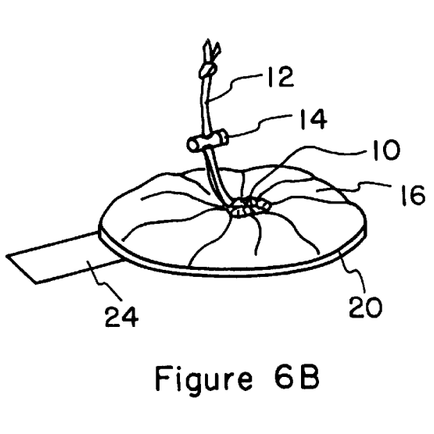

Drawstring 12 is pulled tight and locked into place using cordlock 14. This collapses side 16 and lining 18, and the bowl is pressed down into a flat configuration as shown in FIG. 6B. Drawstring 12 and cordlock 14 are preferably inserted into the interior of the bowl at this point, but this is not necessary. The drawstring when left out can be used as a carrying handle.

Figure 6C:
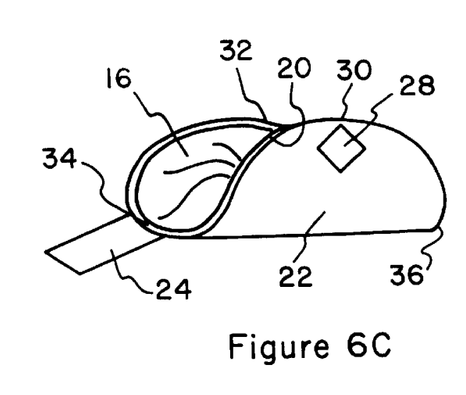

As shown in FIG. 6C the flattened bowl of FIG. 6B is folded upward with the front bottom edge 30, which is equipped with fastener 28, folded upward to meet the opposite back bottom edge 32 which is also being folded upward.

Figure 6D:
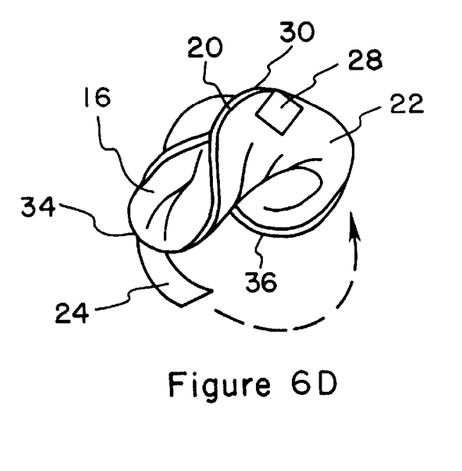

As shown in FIG. 6D, front bottom edge 30 is lapped over back bottom edge 32. This causes the flexible hoop to begin to twist into a helical shape and left bottom edge 34, equipped with mating fastener 26 begins to fold downward toward right bottom edge 36.

Figure 6E:
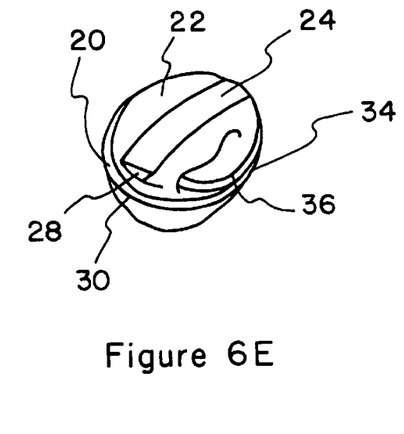

Left bottom edge 34 is lapped over right bottom edge 36 as shown in FIG. 6E, while front bottom edge 30 is adjusted to lap over back bottom edge 32 whereby fastener 28 on front bottom edge 30 mates with mating fastener 26 (not visible) attached to webbing 24 at left bottom edge 34. The two substantially equal smaller circles formed by this folding process are pressed together into a substantially flat configuration.

To open and use the bowl, webbing 24 as shown in FIG. 6E with its mating fastener 26 is pulled loose from fastener 28. The flexible hoop regains its original circular shape and the bowl snaps into the open configuration shown in FIG. 6B. When cordlock 14 is pulled to the end of drawstring 12 and drawstring channel 10 is opened, the bowl retains the shape shown in FIGS. 1 and 6A. Water, food, or other substances are placed into the bowl's interior. The weight of the substance inside pushes out against the loose walls made of lining 18 and side 16 of the bowl, inflating it. When the bowl is no longer needed, remaining contents are emptied, and the bowl is folded up as described above.

The terms "top" and "bottom" and "left" and "right" are used in the above discussion only for purposes of illustration. The device may be held in any orientation to be folded.

All the components of the foldable bowl of this invention are commercially available in a wide range of sizes, so that foldable bowls of any desired size may be constructed so long as the material that is used to construct the bowl will retain liquids or other materials placed inside the bowl, and so long as the flexible hoop can be twisted into the folded shape. Preferably the bowl is constructed with a bottom eight inches in diameter and a top six inches in diameter when open to hold one and one-half quarts of water. Another preferred embodiment may be made to hold one and a half gallons of water, and when this embodiment is made of dark or black material, it may be used as a solar-heated wash basin. This bowl has a diameter of twelve inches at the bottom and eight inches at the top.

In a preferred embodiment, the side is made of 200 D Oxford nylon, the interior is made of one piece of 70 to 140 D coated ripstop nylon, the flexible hoop is a hat grommet or welded springband, the drawstring channel and binding for the top of the bowl is made of polypropylene binding tape, the drawstring is a one-fourth inch wide, flat, woven nylon cord, and the cordlock is a standard cordlock with a one-fourth inch opening.

While the foregoing description sets forth preferred embodiments of the invention, it will be appreciated that the details herein given may be varied by those skilled in the art without departing from the spirit and scope of the appended claims. For example, the bowl does not necessarily need to have a tapering or sloping side or a circular mouth; it can be built using one piece of fabric for the interior and side combination rather than two; it does not require a drawstring or fabric around lip of the bowl; it may be equipped with a flexible hoop at the top of the bowl as well as at the bottom. The outside of the bowl may be made of a single circular piece of fabric, as is the lining of the preferred embodiment. If the bowl is to contain dry or solid substances, the lining need not be waterproof. The bowl may be equipped with a cover, either permanently attached or attached with fasteners.

The flexible hoop is typically flat and made of spring steel. In cross-section it may also be round or any other shape and can also be made of any other flexible material including, but not limited to, Teflon, plastic, fiberglass, cable, cord, rope, hose or rubber, e.g. rubber o-rings, and the like, so long as it shares essential characteristics of a spring steel band, i.e. (1) capability of being folded by twisting into series of circles which can be folded onto each other, resulting in a circular configuration of a smaller diameter than the original band; and (2) capability of returning to its original shape and size when unfolded. The preferred configuration uses a flat hat grommet or welded springband which folds into a helical shape. The flexible hoop may be capable of twisting to form three or more circles which collapse onto each other. Bowls made to fold by means of a hoop forming three or more circles may be folded by methods analogous to those discussed above, by twisting the hoop to form the smaller circles. Fastening means are attached to the surfaces which become the opposite surfaces of the folded configuration to secure the device in its folded position. Other configurations may use a hoop that is round rather than flat in cross-section, which may be twisted into a figure eight, the two attached circles which can then be folded onto each other, also resulting in a circle of smaller diameter.

The preferred configuration shows "hook and loop" fasteners used to hold the folded bowl closed, but a variety of alternative fasteners, including but not limited to buckles, snaps, clips, hooks and eyes, ties and zippers may be used. While the illustrated configuration shows a one-piece interior, interiors made of two or more pieces may also be used. Knots or other restraining devices may be used in place of cordlocks.

I claim:

1. A foldable bowl comprising:
   a) a frusto-conical side wall, having a top and a bottom edge, which is capable of being folded and of returning to its original shape after folding;
   b) a circular bottom, attached to said side which is capable of being folded and of returning to its original shape after folding;
   c) a channel attached to an outer edge of the bottom and radially disposed outside the perimeter of said side wall;
   d) a springband disposed within said channel which is capable of being bent and of returning to its original shape after bending; and
   e) the remaining bowl above said springband being devoid of another said springband.

2. A foldable bowl of claim 1 wherein said top and bottom edges of said side are circular.

3. A foldable bowl of claim 1 also comprising a drawstring channel, attached to or formed as an integral part of said top edge of the side, and comprising a drawstring disposed within said channel.

4. A foldable bowl of claim 1 also comprising a water-resistant lining disposed within the space formed by said bottom and side.

5. A foldable bowl of claim 4 wherein said water-resistant lining is formed of a single, circular piece of material which is capable of being folded and of returning to its original shape after folding.

6. A foldable bowl of claim 3 also comprising a cordlock threaded on said drawstring.

7. A substantially leakproof foldable bowl of claim 1 sized to hold at least one and one-half quarts of liquid.

8. A substantially leakproof foldable bowl of claim 1 sized to hold at least one and a half gallons of liquid.

9. A foldable bowl of claim 1 wherein said springband is capable of being twisted to form at least two smaller circles.

10. A foldable bowl of claim 1 wherein said springband is capable of being twisted to form at least three smaller circles.

11. A foldable bowl of claim 1 comprising fasteners for securing said bowl in a folded configuration.

12. A method of folding the foldable bowl of claim 1 comprising:
 a) collapsing said side whereby the bowl is in a flat configuration;
 b) folding opposite sides of said flat configuration together;
 c) overlapping one of said opposite sides over the other whereby said springband is twisted causing points on the sides thereof orthogonal to the overlapping portions to move toward each other;
 d) overlapping one of said orthogonal points over the other whereby said springband forms two smaller, substantially equal circles; and
 e) pressing said smaller circles together and securing them in place.

13. A method of presenting the substance for use in a foldable bowl of claim 1 comprising:
 a) unfolding said bowl from its folded to its open position;
 b) placing said substance in said bowl.

14. A foldable bowl comprising:
 a) a frusto-conical side wall, having a top edge and a bottom edge, the diameter of the bottom edge being larger than the diameter of the top edge, made of a single strip of material, which is capable of being folded and of returning to its original shape after folding, by sewing the ends of said strip together;
 b) a bottom made of a circular piece of material, which is capable of being folded and of returning to its original shape after folding, having an outer edge attached to the bottom edge of said side wall;
 c) a channel, attached to an outer edge of the bottom and radially disposed outside the perimeter of said side wall;
 d) a springband disposed within said channel which is capable of being bent and of returning to its original shape after bending;
 e) the remaining bowl above said springband being devoid of another said springband;
 f) a water-resistant lining disposed within a space formed by said side wall and bottom;
 g) a drawstring channel attached to or formed as an integral part of the top edge of the side wall;
 h) a drawstring disposed within said drawstring channel;
 i) a cordlock threaded onto said drawstring;
 j) a first fastener attached to a surface of said bottom at the edge thereof; and
 k) a mating fastener attached by means of a strip of material to a point on said bottom orthogonal to said first fastener.

15. A method of making the foldable bowl of claim 1 comprising:
 a) forming a side for said bowl of a material which is capable of being folded and of returning to its original shape after folding;
 b) attaching to said side a bottom made of a material which is capable of being folded and of returning to its original shape after folding; and
 c) attaching a springband, which is capable of being bent and of returning to its original shape after bending, to an outer edge of the bottom.

16. The method of claim 15 also comprising attaching fastening means to the material of the bottom for securing said bowl in its folded configuration.

17. The method of claim 15 also comprising forming said side of a strip of material, which has one edge thereof shorter than the other, and the two ends cut at the same angle, by matching the edges of the two ends and fastening them together, whereby said side tapers to a smaller diameter from bottom to top.

18. The method of claim 15 also comprising inserting a circular piece of water-resistant material, capable of being folded and of returning to its original shape after folding, into the space formed by said side and bottom as a lining.

19. The method of claim 15 also comprising securing the outer edge of said lining to the top edge of said side.

20. The method of claim 15 also comprising placing a drawstring channel at the top edge of said side.

* * * * *